United States Patent
Good

(10) Patent No.: US 11,948,234 B1
(45) Date of Patent: Apr. 2, 2024

(54) SYSTEMS AND METHODS FOR DYNAMIC ENHANCEMENT OF POINT CLOUD ANIMATIONS

(71) Applicant: Illuscio, Inc., Culver City, CA (US)

(72) Inventor: Max Good, Culver City, CA (US)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 18/458,513

(22) Filed: Aug. 30, 2023

(51) Int. Cl.
  G06T 13/20 (2011.01)
  G06T 5/70 (2024.01)
  G06T 7/70 (2017.01)
  G06T 19/20 (2011.01)

(52) U.S. Cl.
  CPC .......... G06T 13/20 (2013.01); G06T 7/70 (2017.01); G06T 19/20 (2013.01); G06T 2207/10028 (2013.01); G06T 2210/56 (2013.01); G06T 2219/2012 (2013.01); G06T 2219/2016 (2013.01)

(58) Field of Classification Search
  CPC ........ G06T 13/20; G06T 5/002; G06T 19/20; G06T 2207/10028; G06T 2210/56; G06T 2219/2012; G06T 2219/2016
  See application file for complete search history.

(56) References Cited

U.S. PATENT DOCUMENTS

| | | | |
|---|---|---|---|
| 2006/0210146 A1* | 9/2006 | Gu | G01B 11/2513 382/154 |
| 2007/0285419 A1* | 12/2007 | Givon | G06V 10/245 348/46 |
| 2009/0040371 A1* | 2/2009 | Hunter | H04N 25/60 348/E11.021 |
| 2012/0249557 A1* | 10/2012 | Ferguson | G06T 13/00 345/473 |
| 2016/0328628 A1* | 11/2016 | Bhat | G06T 13/40 |
| 2020/0242834 A1* | 7/2020 | Chachek | G06V 40/23 |
| 2021/0049811 A1* | 2/2021 | Fedyukov | G06T 7/60 |
| 2022/0049960 A1* | 2/2022 | Xie | G01S 5/0072 |
| 2022/0151756 A1* | 5/2022 | Pesach | A61B 1/24 |
| 2022/0187847 A1* | 6/2022 | Cella | G06Q 50/40 |
| 2022/0197306 A1* | 6/2022 | Cella | G06N 3/088 |
| 2022/0245574 A1* | 8/2022 | Cella | G06Q 10/087 |
| 2023/0068727 A1* | 3/2023 | Saphier | A61C 9/006 |
| 2023/0094522 A1* | 3/2023 | Stauber | G06T 15/506 715/719 |
| 2023/0222736 A1* | 7/2023 | Vandrotti | G06T 7/12 345/420 |

* cited by examiner

*Primary Examiner* — YuJang Tswei
(74) *Attorney, Agent, or Firm* — Ansari Katiraei LLP; Arman Katiraei; Sadiq Ansari

(57) ABSTRACT

Disclosed is a system and associated methods for dynamically enhancing a three-dimensional ("3D") animation that is generated from points of one or more point clouds. The system reduces noise and corrects gaps, holes, and/or distortions that are created in different frames as a result of adjusting the point cloud points to create the 3D animation. The system detects a set of points that share positional and/or non-positional commonality of a feature in the 3D animation. The system applies one or more adjustments to the set of points to animate feature from a current frame to a next frame, and detects a point from the set of points that deviates from the positional and/or non-positional commonality of the feature after applying the adjustments. The system dynamically enhances the 3D animation by correcting the point prior to rendering the next frame of the 3D animation.

20 Claims, 8 Drawing Sheets

SYSTEMS AND METHODS FOR DYNAMIC ENHANCEMENT OF POINT CLOUD ANIMATIONS

BACKGROUND

Three-dimensional ("3D") animations may involve manipulating 3D models that are defined as a connected set of meshes or polygons. The connected set of meshes or polygons may be linked to a skeletal framework, and may be moved relative to linked bones and/or pivot points of the skeletal framework. Manipulating the 3D models may include stretching, skewing, moving, or otherwise deforming the connected set of meshes or polygons as well as textures that are overlaid onto the meshes or polygons.

The transformations that may be applied to meshes or polygons in order to produce an animation usually cannot be applied to point clouds. Point clouds represent a 3D object or scene as a disconnected and distributed set of points. Unlike meshes and polygons that form a single continuous surface that can be stretched, skewed, moved and/or otherwise deformed collectively because of the connectivity between the meshes or polygons, the points of a point cloud exist independent of one another, are not a shape that can be stretched, skewed, or deformed, and/or lose the form of the feature they represent if stretched, skewed, or otherwise deformed like a mesh or polygon.

DETAILED DESCRIPTION OF PREFERRED EMBODIMENTS

Figure 1:
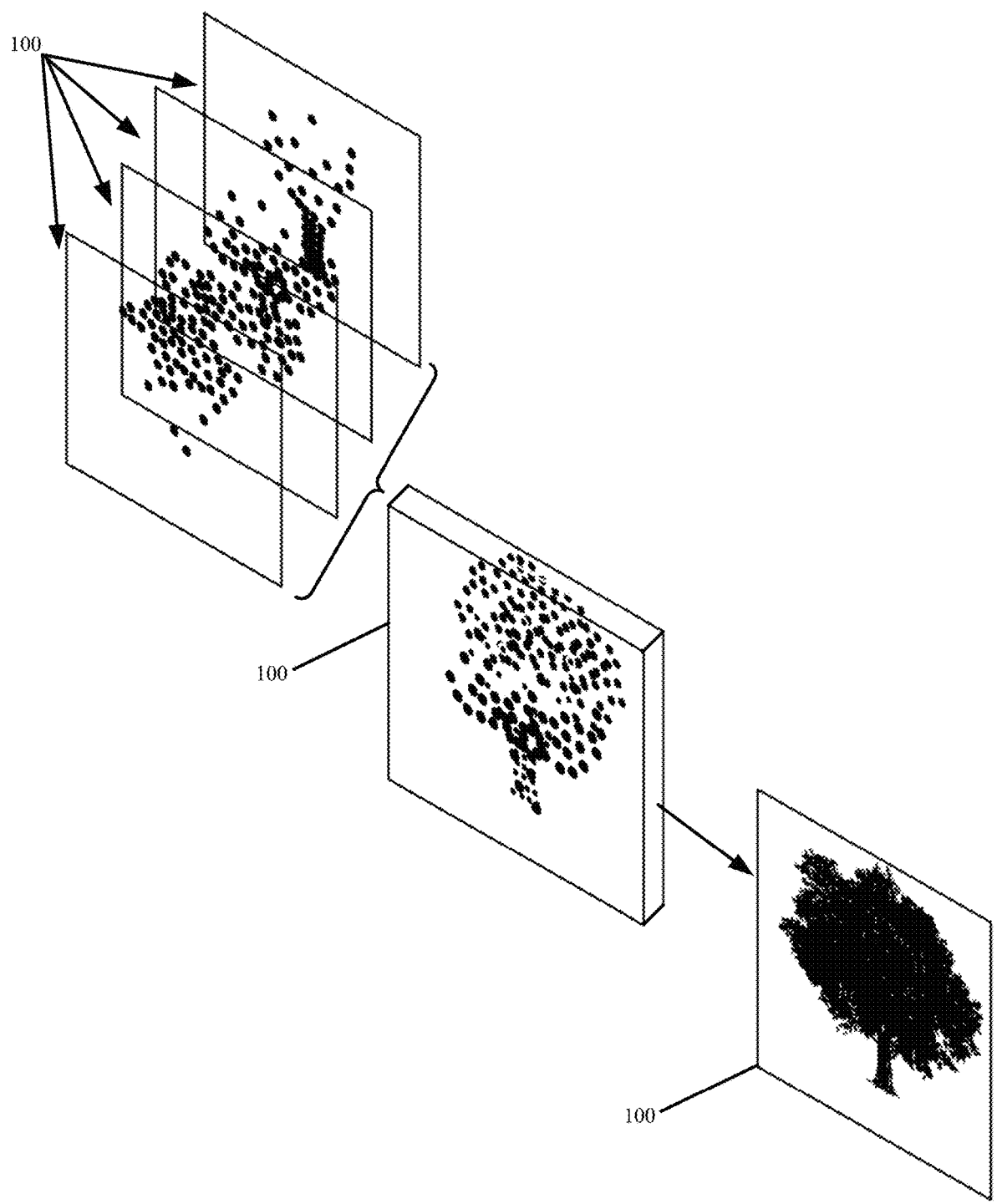
FIG. 1 illustrates an example point cloud in accordance with some embodiments presented herein.

The following detailed description refers to the accompanying drawings. The same reference numbers in different drawings may identify the same or similar elements.

Provided are systems and associated methods for dynamic enhancement of point cloud animations. A point cloud animation is a three-dimensional ("3D") animation that is created from moving and adjusting points of a point cloud at different instances in time to simulate motion and visual change in a represented 3D scene.

In some embodiments, the dynamic enhancement of a point cloud animation includes reducing noise from the 3D object or scene that is represented by points of a point cloud. The noise may be introduced into the point cloud animation when transforming and/or adjusting the points to create the animation. The transformations may be improperly applied to some points such that the noisy points become detached from a represented surface or feature, improperly overlap with points of a different surface or feature, and/or deviate from the positional and/or visual commonality of other points representing the same surface or feature as the noisy points. Accordingly, the noise reduction includes removing or correcting the noisy points so that the represented surfaces or features are continuous and formed by points that share the positional and/or visual characteristic commonality of the represented surface or feature. The noise reduction may be performed in conformance with and/or in continuance of the noise reduction that was applied to previous frames of an animation so as to enhance the detail of the 3D object or scene over the duration of the animation and to ensure that the animation is seamless and continuous without noise appearing and disappearing at different positions in different frames of the animation.

In some embodiments, the dynamic enhancement includes supplementing an existing set of points for a represented surface or feature that becomes deformed over the course of an animation. the 3D animation system may artificially generate new points that restore a shape, form, and/or appearance of the represented surface or feature after it is deformed as a result of transformations that are applied to the existing set of points. For instance, animating the existing set of points may include moving or repositioning different subsets of the existing set of points in a manner that creates gaps, holes, or discontinuities in the represented surface or feature. The 3D animation system may detect the gaps, holes, or discontinuities over the course of the animation, may generate new points that obscure the gaps, holes, or discontinuities, and may animate the new points to move seamlessly as part of the represented surface or feature and/or according to a non-linear movement of the animation across different frames of the animation. In some such embodiments, the generated new points are defined to repair or restore a structural pattern or visual characteristics of the represented surface or feature that may be distorted at specific parts due to how the transformation are applied to the existing set of points.

The 3D animation system may use artificial intelligence and/or machine learning ("AI/ML") techniques to improve the noise detection and reduction and also the distortion detection and correction with the supplemented points. The AI/ML techniques may perform image, object, or pattern recognition to detect the feature or surface that one or more deviating points and non-deviating points represent. The AI/ML techniques may obtain and/or generate an animation model that tracks possible movements and color changes of the represented feature or surface. The animation model may be derived from a supervised learning, available videos, and/or sample animations that demonstrate the possible movements and color changes of the represent feature or surface. The AI/ML techniques may adjust the one or more deviating points according to the animation model so that the deviating points remain aligned with and emulate the movement and color changes of the non-deviating points of the same feature or surface.

FIG. 1 illustrates an example point cloud 100 in accordance with some embodiments presented herein. The points of point cloud 100 differ from pixels of a two-dimensional ("2D") image, because certain regions of point cloud 100 have no points, lower densities of points, and/or higher densities of points based on varying amounts of visual information that is detected, scanned, or created at those regions. Additionally, the position of the point cloud points are defined in a three-dimensional 3D space using x, y, and z coordinate values. In contrast, pixels of a 2D image are defined in a 2D space and have a uniform density or fixed arrangement that is defined by the resolution of the 2D image. In other words, the point cloud points may have a non-uniform placement or positioning, whereas the 2D image has pixel data for each pixel of a defined resolution (e.g., 640×480, 800×600, etc.).

Each point cloud point is defined independently and with elements that are not dependent or based on elements of other points. The elements include a first set of positional elements and a second set of non-positional or descriptive elements. Values for the positional elements and/or non-positional elements of a particular point may be calculated from the return intensity of the light, laser, or signal reflecting off a corresponding surface and returning to the scanning device.

The positional elements include coordinates within a 3D space. For instance, each point cloud point includes x-coordinate, y-coordinate, and z-coordinate elements to capture the position of a corresponding physical point from a surface, feature, or object. The positional elements may further include a surface normal. The surface normal defines the angle, direction, or orientation that the surface, feature, or object represented by the point faces or is exposed to. More specifically, the surface normal is a line, ray, or vector that is perpendicular to the scanned surface, feature, or object represented by the point. In some embodiments, the positional elements may be defined for created points as opposed to being measured or scanned from physical objects.

The non-positional elements include information about the detected characteristics of the surface, feature, or object at a corresponding position in the scanned scene. The characteristics may correspond to a detected color (e.g., visual characteristics). The color may be represented using red, green, blue ("RGB"), and/or other color component values. In some embodiments, a point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the point.

In some embodiments, the non-positional elements store other measured or derived characteristics including the chrominance, hardness, translucence, reflectivity, luminance, metallic characteristics, roughness, specular, diffuse, albedo, index of refraction ("TOR"), and/or other properties from the imaged or created surface or feature. In some embodiments, the non-positional elements directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic". These material properties may be associated with different values for the chrominance, hardness, translucence, reflectivity, luminance, and/or other visual characteristics of the point defined with a material property.

Each point cloud point includes an array of elements. The array of elements may provide the positioning of the point in a 3D space (e.g., the positional elements) as well as one or more characteristics (e.g., the non-positional elements) of that point. For instance, a point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

The points are disconnected from one another. One point may be moved or otherwise adjusted without impacting any other point in point cloud 100. A set of points may represent a particular surface or feature based on dense or close positioning of the set of points and/or based on a pattern, structural arrangement, or other positional commonality amongst the set of points forming that particular surface or feature. Similarly, a set of points may represent a particular surface or feature based on color and/or other visual characteristic commonality amongst the set of points. Accordingly, a point cloud may form a 3D object or scene based on the pointillism technique that causes nearby but separate points to appear connected and part of the same surface or feature.

A point cloud may be animated in any of several ways. One point cloud animation technique may include defining a different point cloud for each frame of the animation with each point cloud moving or changing one or more sets of points in a previous point cloud of the animation. Another point cloud animation technique may include defining functions, expressions, or other transformations that are linked to different sets of points, and that adjust the positioning and/or coloring of the different sets of points over time to create the animation. Yet another point cloud animation technique may include defining a skeletal framework with bones connected to pivot points, linking different sets of points to the defined bones and/or pivot points of the skeletal framework, animating the skeletal framework, and adjusting the different sets of points according to the movements specified for the linked bones and/or pivot points of the skeletal framework.

With any point cloud animation technique, adjusting the points includes repositioning the points, changing color values of the points, adding new points, deleting existing points, and/or changing other positional or non-positional properties of the points. The points are uniform in size and are not stretched or skewed as may be done with meshes or polygons. When the points are moved as part of an animation, the movement may cause certain regions of the point cloud to become sparse, thereby exposing gaps, holes, or discontinuities in the surface or feature represented by the sparsely distributed points.

Figure 2:
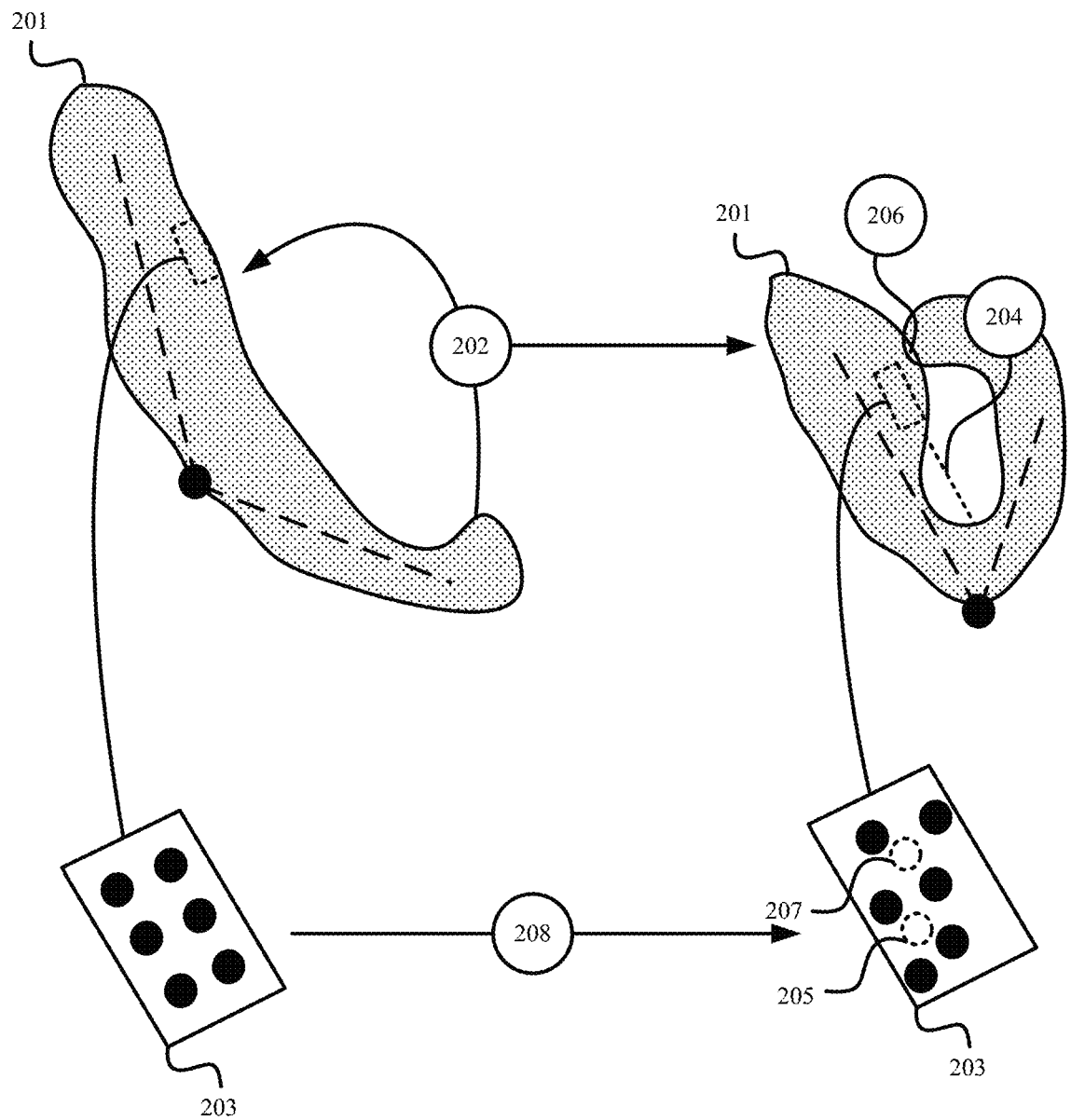
FIG. 2 illustrates an animation example with gaps, holes, or other discontinuities that appear in the point cloud representation as a result of adjusting the point cloud points for the animation in accordance with some embodiments presented herein.

FIG. 2 illustrates an animation example with gaps, holes, or other discontinuities that appear in the point cloud representation as a result of adjusting the point cloud points for the animation in accordance with some embodiments presented herein. Set of points 201 represents a human arm. The animation models movement of the arm. For instance, a first subset of set of points 201 that represent the hand and forearm and a second subset of set of points 201 that represent the upper arm collectively move (at 202) at a pivot point. The pivot point is defined to model movement about the elbow. In some embodiments, the first subset of points and the second subset of points are linked to different bones of a skeletal framework that are connected to the pivot point. The first subset of points retain their relative position to a first bone, whereas the movement defined for the second subset of points models a bicep and/or other muscle contractions and a concentration of the second subset of points about a center of the upper arm. In some other embodiments, functions are defined to recreate the forearm and bicep movements. For instance, a first function is linked to the second subset of points and is defined with parameters that control the range and speed with which to move different points of the second subset of points in order to recreate the muscle contraction.

The adjustments made in order to animate the first and second subset of points creates various gaps, holes, and/or visual inconsistencies. For instance, the animation causes the second subset of points to move and create (at 204) a visual discontinuity above the elbow. Specifically, the muscle contraction animation moves and concentrates the second subset of points about the center of the upper arm such that the portion of the upper arm above the elbow appears unnatural and is represented with too few points. The movement also causes some of the first subset of points to overlap (at 206) with the second subset of points, thereby creating noise if spacing between the overlapping points incorrectly causes the coloring of the points to blend together. Also, zoomed-in view 203 illustrates gaps 205 and 207 forming (at 208) as a result of adjusting the second subset of points so that they are concentrated about the center of the upper arm.

The 3D animation system corrects these and other issues that occur from animating the points of a point cloud in order to render the point cloud animation without noise, gaps, and/or other visual inconsistencies or anomalies. In some embodiments, the 3D animation system enhances the animation by removing noise created from points that are improperly adjusted, uniformly adjusted when they should be disproportionately adjusted, and/or adjusted in a manner that creates an unnatural form or color in different frames of the animation or for different features or surfaces represented by the points. The noise removal creates smooth, seamless, and accurate transitions between frames of an animation created from rendering points of a point cloud at different positions or with different colors at different times. Specifically, the noise removal eliminates unnatural geometries, irregular patterns, and/or disconnected, detached, or deviating points from being rendered as part of the animation.

Figure 3:
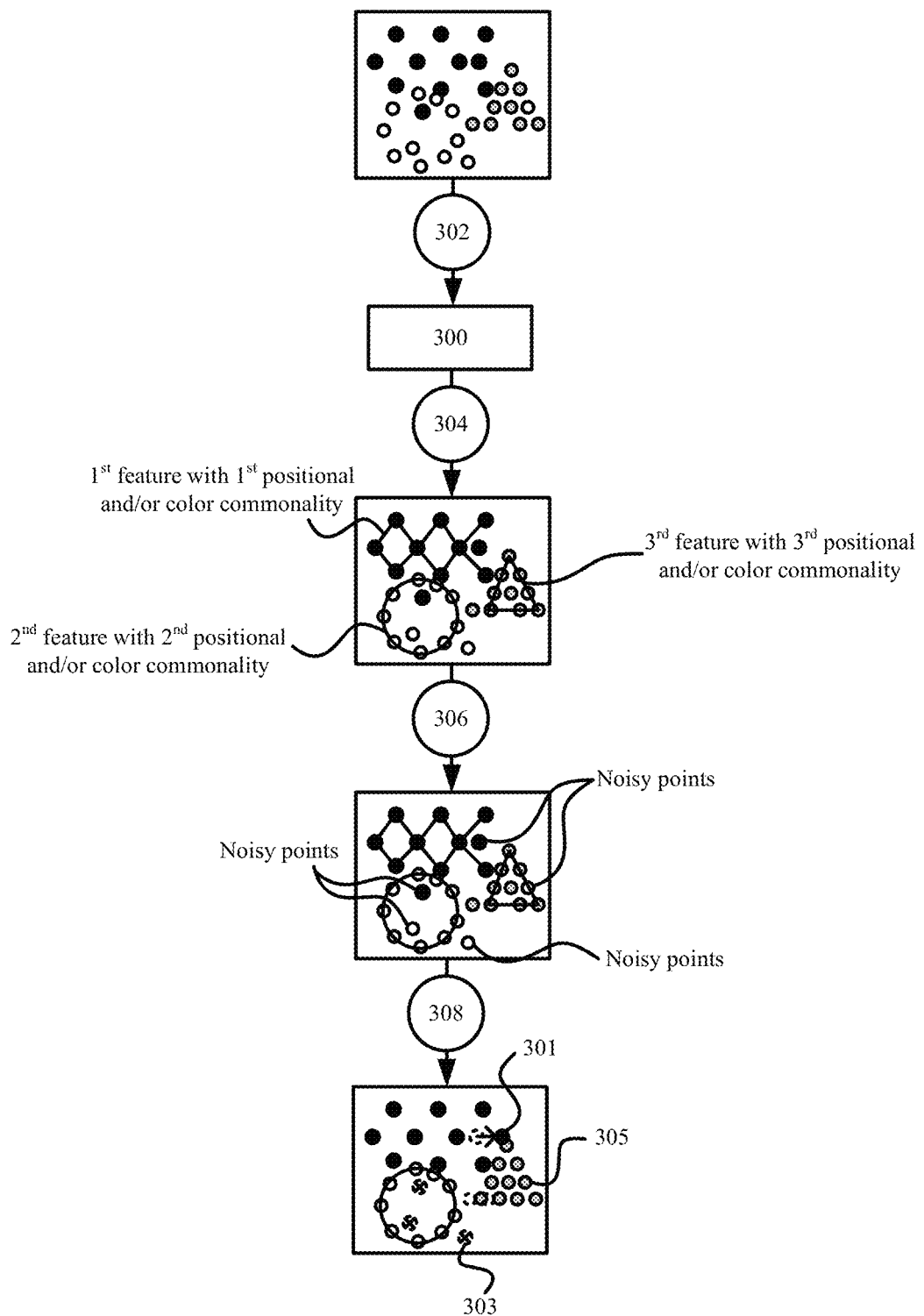
FIG. 3 illustrates an example of removing noise from a point cloud in order to dynamically enhance an animation that is generated from adjusting the point cloud in accordance with some embodiments presented herein.

FIG. 3 illustrates an example of removing noise from a point cloud in order to dynamically enhance an animation that is generated from adjusting the point cloud in accordance with some embodiments presented herein. 3D animation system 300 receives (at 302) a point cloud that contains the points for one or more frames of the animation. For instance, the point cloud may contain the positional and non-positional data for generating a first frame of the 3D animation. Transformations or links between different sets of points and a skeletal model may be used animate the different sets of points. Alternatively, each frame of the 3D animation may be defined as separate point cloud such that the received (at 302) point cloud may represent any frame of the 3D animation.

3D animation system 300 performs (at 304) feature detection based on the positioning and visual characteristics (e.g., colors, reflectivity, opacity, material properties, and/or other positional and non-positional elements) of the points. The feature detection involves determining sets of points that are related on the basis of forming a common surface, part, or feature within the 3D scene represented by the point cloud. For instance, even though each point of the point cloud is disconnected from other points and is defined independent of the other points, two or more points that form a continuous or larger surface, part, or feature within the represented 3D scene will have some positional and/or visual characteristic commonality. Performing (at 304) the feature detection involves identifying the different sets of points with positional and/or visual characteristic commonality.

In some embodiments, 3D animation system 300 may use one or more AI/ML techniques to perform (at 304) the feature detection. The AI/ML techniques may render the point cloud, detect shapes and forms within the rendered visualization, perform searches of the detected shapes and forms to determine if they represent known or recognized features, and classify a set of points when the detected shape or form represented by the set of points corresponds to a recognized feature.

In some embodiments, 3D animation system 300 performs (at 304) the feature detection by detecting patterns for the positional and/or visual characteristic commonality amongst a related set of points. For instance, a set of points that represent a common surface will likely be positioned or arranged according to the pattern of that common surface. More specifically, a first set of points representing a plastic surface will have a different structural arrangement than a second set of points represented a wooden surface. Similarly, a first set of points representing a tree leaf will have a different positional commonality than a second set of points representing a tree branch. The feature detection also detects commonality in the non-positional elements of the points. For instance, a first set of points that represent a first surface will likely have color, reflectivity, and opacity values that are within a first range of values, and a second set of points that represent a second surface will likely have color, reflectivity, and opacity values that are within a different second range of values (e.g., leaves of a tree having first color commonality and branches of the tree having second color commonality). Accordingly, even if the first and second surfaces or features were next to each other and have the same structural patterning, 3D animation system 300 may differentiate between the sets of points for the different surfaces or features based on different commonality in the visual characteristics of the points.

3D animation system 300 performs (at 306) noise detection within each set of points of a related feature that is identified from performing (at 304) the feature detection. Each set of points is determined to represent a different surface or feature in the 3D scene represented by the point cloud as a result of the set of points having some positional and/or non-positional commonalty. Performing (at 306) the noise detection involves detecting outlying or deviating points.

An outlying or deviating point may include a point from the point cloud that does not share the positional commonality and/or non-positional commonality of any of the detected features of the point cloud. For instance, an outlying or deviating point may be a point that is along the same plane as a set of points with structural commonality, and that has widely different color values than the set of points.

An outlying or deviating point may also include a point that is determined to be part of a set of points representing a detected feature, but that has an outlying value within the detected commonality of that detected feature. For instance, the set of points may represent a continuous surface with a particular structural pattern about which the set of points are arranged. More specifically, the set of points may be arranged according to a repeating diamond pattern. An outlying or deviating point in the set of points may be arranged according to the repeating diamond pattern, but may be separated by a larger or deviating distance than other points in the repeating diamond pattern.

The outlying or deviating points create noise and/or lower the detail or quality in the visualization or rendering of the point cloud. More specifically, the noise includes points that are disconnected from or deviate from the positional and/or non-positional commonality of neighboring points, and therefore create visual inconsistencies in the rendered frame of the animation.

Noise may be introduced when scanning a 3D scene or object in order to obtain the positional and/or non-positional measurements of the points of the point cloud that represent that 3D scene. The noise may be caused by inaccuracies in the measurements obtained by the measuring device, obstacles that prevent an unobstructed scanning parts of the 3D scene or object, different properties of the 3D scene or object that affect the scanning, and/or other factors. For instance, some surfaces may have very low or very high reflectivity that distort measurements taken by light detection and ranging ("LiDAR"), time-of-flight, structure light, and/or other sensors. The distorted measurements produce points with inaccurate positions and/or visual characteristics.

3D animation system 300 reduces (at 308) the noise by removing or adjusting the detected noisy points (e.g., the outlying or deviating points that create the detected noise). In some embodiments, the noise reduction (at 308) involves eliminating or removing the outlying or deviating points from the point cloud prior to generating an image or frame of the animation. In some embodiments, the noise reduction (at 308) involves adjusting the positional and/or non-positional elements of the outlying or deviating points to more closely adhere to the commonality shared by a set of points of a detected feature that the outlying or deviating point is detected to be a part of.

Adjusting the positional elements of an outlying or deviating point may include adjusting the position of that point so that the position of the outlying or deviating point more closely adheres to the structural pattern with which the points of the detected feature are arranged. For instance, 3D animation system 300 adjusts the positioning of point 301 so that it conforms with the identified structural pattern of other points representing the same first feature or surface in the point cloud, and removes point 303 as it distorts the structural pattern of a second feature or surface in the point cloud.

In some embodiments, the noise reduction (at 308) may be applied to sharpen edges of different intersecting edges in a point cloud. For instance, 3D animation system 300 may detect a first set of points with a first positional and/or color commonality that form a first surface that intersects or has a common edge with a second surface that is formed by a second set of points having a second positional and/or color commonality. 3D animation system 300 may further detect that one or more deviating points of the first set of points cross the edge and overlap with points of the second surface. 3D animation system 300 reduces the noise by shifting the one or more deviating points over to the region or space spanned by the first surface, thereby sharpening the edge between the two surfaces and/or the detail for each of the first and second surfaces.

Adjusting the non-positional elements of an outlying or deviating point may include adjusting the visual characteristics of that point so that the visual characteristics of the outlying or deviating point is within an acceptable range of the visual characteristics for other points determined to be part of the same detected feature as the outlying or deviating point. This may include averaging the color values of the outlying or deviating point with the color values of surrounding points that are part of the same detected feature as the outlying or deviating point, or replacing the color values of the outlying or deviating point with the color values of one or more surrounding points that are part of the same detected feature as the outlying or deviating point. For instance, 3D animation system 300 adjusts the coloring of point 305 that has positional commonality with a set of points representing a particular feature so that point 305 also has color commonality with the set of points.

In some embodiments, one or more AI/ML techniques may be used to improve the noise reduction (at 308). For instance, the AI/ML techniques may determine that an outlying point and a set of points are part of a detected feature that corresponds to a particular wooden surface. The AI/ML techniques may retrieve a 3D model of the particular wooden surface, may compare the positioning of the outlying point and the set of points to a structural pattern of the 3D model, and may adjust the position of the outlying point to conform with the structural pattern of the 3D model.

3D animation system 300 may perform (at 308) the noise reduction when generating the point cloud. For instance, 3D animation system 300 may receive scan data from a LiDAR, time-of-flight, structured light, and/or other 3D depth sensor. Rather than generate a point at each position identified in the scan data, 3D animation system 300 may analyze the scan data, detect anomalous position or values, and perform (at 308) the noise reduction to correct or remove the anomalous positions or values detected in the scan data.

Similarly, 3D animation system 300 may receive two-dimensional ("2D") images that capture the same 3D scene from different positions, and may generate points for a point cloud representation of the 3D scene based on a photogrammetry technique that is applied to the 2D images. During the photogrammetry processing, 3D animation system 300 may detect that one of the 2D images is blurry or is not sharp. Rather than generate points based on the blurry or not sharp positioning or color values, 3D animation system 300 may perform (at 308) noise reduction when generating the points of the point cloud. For instance, 3D animation system 300 may align overlapping parts of the 2D images, and may correct blurry or unsharp regions of one image based on overlapping clear and sharp regions of another image, and may perform the photogrammetry procedure to generate points of the point cloud once the noise in the 2D images has been corrected.

In some embodiments, 3D animation system 300 differentiates between intentional noise and unintentional noise by comparing noise in different frames of the animation. If a first set of noisy points is present in an original point cloud or a subsequent reference point cloud and is carried over into subsequent frames of the animation (e.g., frames created from adjusting the original point cloud or the reference point cloud with one or more transformations), then 3D animation system 300 may retain the first set of noisy points in the subsequent frames and not remove or reduce the noise as the deviating patterns or colors of the first set of noisy points may be part of the animation. However, if a second set of noisy points is not present in an earlier frame of the animation and is introduced as a result of transformations applies to the points of the earlier frame, then 3D animation system 300 may determine that the second set of noisy points were not intentionally added and should be removed or reduced as part of generating and enhancing the subsequent frame of the animation. Accordingly, to ensure smooth and seamless transitions between the different frames, 3D animation system 300 performs noise reduction that references not only 3D image data within a current frame of the animation, but also 3D image data from one or more prior frames.

The references to the earlier frames when performing the noise reduction also ensures that the noise is consistently reduced or removed across different frames of the animation. For instance, the same deviating point may be present in first and second frames of a point cloud animation. If the noise (e.g., the deviating point) was reduced in the second frame independent of how the same noise was reduced in the first frame, the 3D animation system 300 may reposition or change the color values of the same deviating point differently in each frame resulting in flickering and/or points transitioning inconsistently between the frames. More specifically, the deviating point may be rendered at a first position in the first frame and may jump to a second position in the second frame in a manner that creates a visual inconsistency or noticeable divergence between the two frames. Over a longer time period (e.g., hundreds of frames spanning several seconds), the continual repositioning or recoloring of the deviating points can distract the viewer and/or lower the overall quality and detail of the animation.

Figure 4:
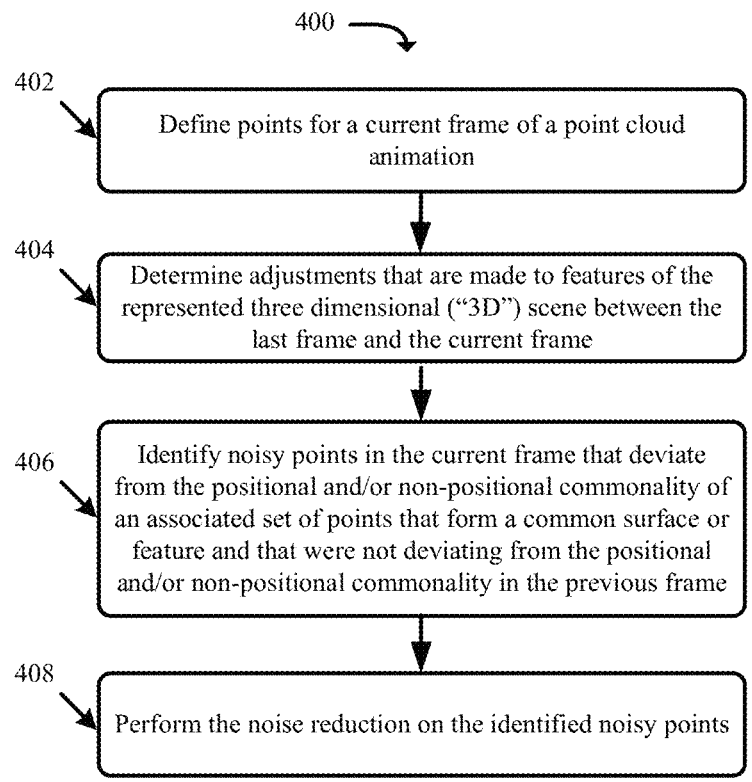
FIG. 4 presents a process for reducing noise in an animation by referencing noise reduction performed in previous frames of the animation in accordance with some embodiments presented herein.

FIG. 4 presents a process 400 for reducing noise in an animation by referencing noise reduction performed in previous frames of the animation in accordance with some embodiments presented herein. Process 400 is implemented by 3D animation system 300. 3D animation system 300 includes one or more devices or machines with processor, memory, storage, network, and/or other hardware resources that generate and render 3D animations and/or process point clouds. 3D animation system 300 may be a centralized or distributed set of devices that are accessed over a data network by client devices, or may be integrated as part of a client device (e.g., desktop computer, laptop computer, tablet computing device, smartphone, wearable smart device, set top viewing device, etc.).

Process 400 includes defining (at 402) points for a current frame of a point cloud animation. The points for the current frame of the point cloud animation may be defined (at 402) in a point cloud that is separate and/or distinct from the points of a last frame. Alternatively, the points for the current frame of the point cloud animation may be defined based on one or more transformations that are applied to the points of the last frame of the animation. For instance, one or more functions may be applied to different points of the last frame in order to adjust the positioning and/or visual characteristics of the different points for the current frame. In any case, 3D animation system 300 will have performed the noise reduction on the points of the last frame of the point cloud animation to remove any outlying or deviating points from the last frame. However, the current frame may be defined with some of the same or different outlying or deviating points, or new outlying or deviating points may be generated as a result of the transformations that are applied to the points of the last frame.

Process 400 includes determining (at 404) adjustments that are made to features of the represented 3D scene between the last frame and the current frame. 3D animation system 300 determines (at 404) the adjustments by comparing the sets of points that represent common features in the last frame and the current frame to determine overall changes to those features rather than changes to individual points in each set of points.

Process 400 includes identifying (at 406) noisy points in the current frame that deviate from the positional and/or non-positional commonality of an associated set of points that form a common surface or feature and that were not deviating from the positional and/or non-positional commonality in the previous frame. Accordingly, 3D animation system 300 compares positional and non-positional values of the points in the current to other points that make up a common surface or feature and to the same set of points forming that common surface or feature in one or more prior frames.

In some embodiments, identifying (at 406) the noisy points includes detecting points in the current frame with positional and/or non-positional values that deviate by more than a threshold amount from the adjustments that were made to the common features or other points of the common features formed with the noisy points. For instance, a particular feature that is found in the last frame and in the current frame may be composed of a set of points. 3D animation system 300 may determine that the particular feature moves a particular distance to the right and receives a brightness increase of 10%. A first noisy point in the set of points may include a point that does not move the particular distance to the right or moves disproportionality relative to the other points in the set of points. A second noisy point in the set of points may include a point that does not receive the 10% brightness increase or receives a deviating visual characteristic change that differs from the visual characteristic change made to other points of the set of points. In other words, 3D animation system 300 identifies (at 406) points that make up a feature found in the current frame and the last frame, and that are adjusted differently than other points of the same feature from the last frame to the current frame. If a point was found to be deviating from the positional and/or non-positional commonality in the current frame and the last frame, 3D animation system 300 may retain that point without adjustment as the deviation may be intentional and produce a desired effect that is to be carried over into the current frame.

Process 400 includes performing (at 408) the noise reduction on the identified (at 406) noisy points. Performing (at 408) the noise reduction includes removing the noisy points from the current frame, or adjusting the positional and/or non-positional values of the noisy points to match the adjustments that were made to the other points of the same feature from the last frame. As a result of performing (at 408) the noise reduction based on the tracked adjustments from the last frame to the current frame, 3D animation system 300 generates a seamless and smooth transition in the animation of the features found in the last frame and the current frame, and eliminates points from those features that create noise or visual inconsistency by deviating from the tracked adjustments.

In some embodiments, 3D animation system 300 may use the AI/ML techniques to eliminate noise across different frames of the point cloud animation. The AI/ML techniques may analyze the last frame and the current frame of the animation to detect different sets of points representing different animated features or objects. For instance, the AI/ML techniques may detect a particular set of points in the last frame that form or represent a particular feature, and may detect one or more points of the particular set of points that are adjusted from the last frame to the current frame. The AI/ML techniques query for an animation model of the particular feature. The animation model may represent the motion or changes that are applied to the particular feature over time or the range of motion or changes that may be applied. For instance, if the particular feature is a human hand, the animation model may illustrate rotation of the hand and/or valid movement of the fingers. The AI/ML techniques may then compare the adjustments that are made to the particular set of points against the animation model, and may detect noisy points that do deviate from the animation model.

3D animation system 300 performs other dynamic enhancements to a point cloud animation. For instance, 3D animation system 300 may perform motion-caused distortion correction by supplementing frames of the animation with dynamically generated points. The dynamically generated points may correct gaps or distortions caused in the shape, form, and/or appearance of a feature as a result of animating or adjusting that feature. Accordingly, the noise reduction may remove or correct anomalous points or data that create visual inconsistencies in the rendered frames of the animation, and the motion-caused distortion correction may add points or data to ensure visual consistency as features are adjusted over the course of the animation.

Figure 5:
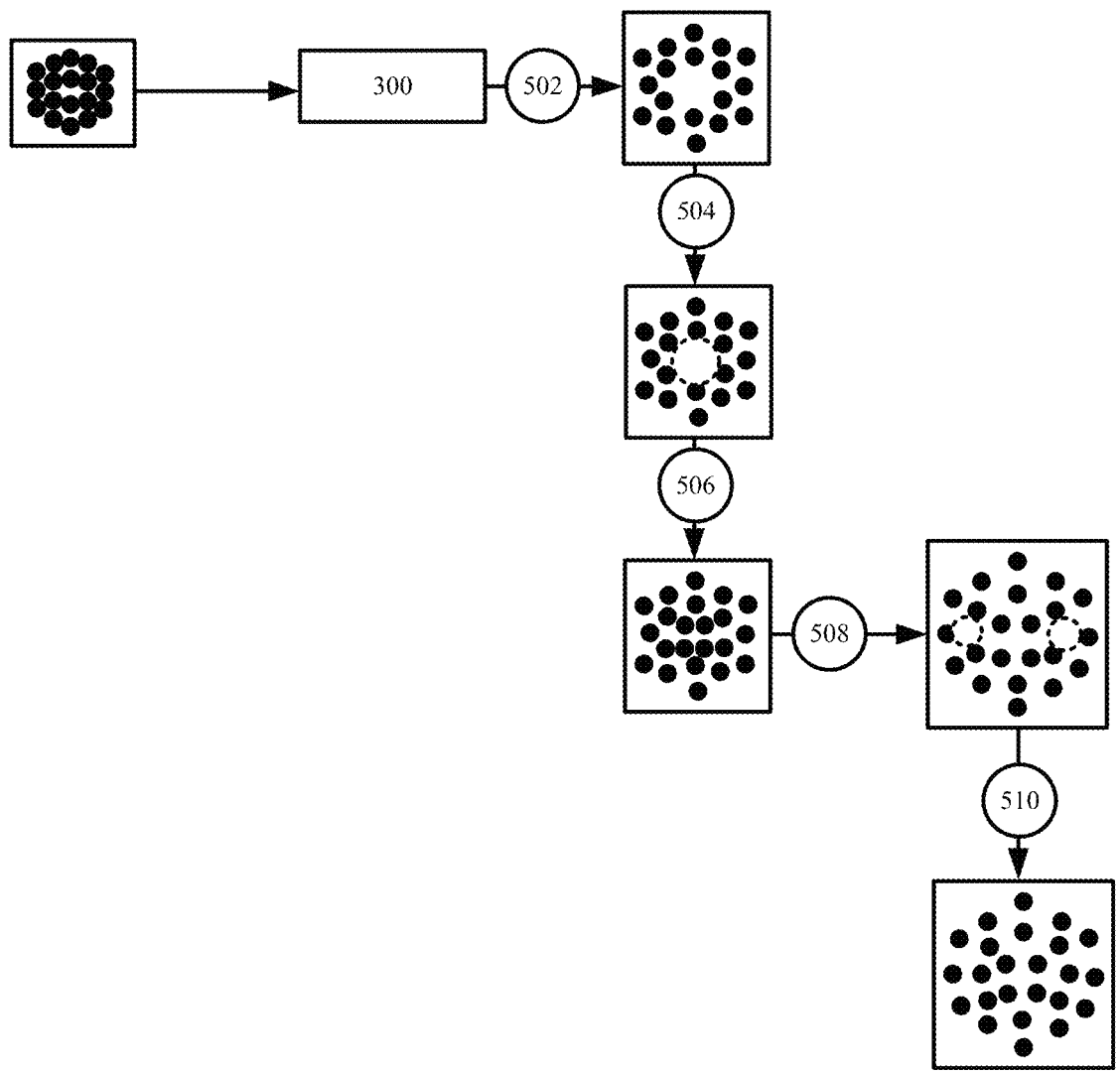
FIG. 5 illustrates an example of dynamically enhancing a point cloud animation by performing the motion-caused distortion correction to conceal gaps in accordance with some embodiments presented herein.

FIG. 5 illustrates an example of dynamically enhancing a point cloud animation by performing the motion-caused distortion correction to conceal gaps in accordance with some embodiments presented herein. A distortion or gap is created after 3D animation system 300 adjusts (at 502) a set of points from a last frame of the animation in order to generate a current frame of the animation. The adjustment may be defined in a separate point cloud associated with the current frame of the animation that differs from another point cloud associated with the last frame of the animation, or may be defined as an expression, formula, or other transformation for the positional and/or non-positional changes to apply to the set of points of the last frame. The transformation may be unable to produce subtle or nuanced changes over different points of the set of points. As a result, applying the transformation to different set of points may produce a distortion in the rendered 3D scene or in the feature represented by the adjusted set of points especially over time as more adjustments are made to the set of points or different points in the set to animate the represented feature.

3D animation system 300 detects (at 504) the distortion caused by the adjustment made to the set of points for the current frame. In some embodiments, the distortion is a gap, hole, or other visual inconsistency that is created as a result of adjusting the set of points. As shown in FIG. 5, 3D animation system 300 applies an expand transformation to the points of a last frame, and the point density decreases as the spacing between the points increases because of the expand transformation. The spacing between some points may exceed a spacing threshold at which gaps or the separation between the points becomes visible or noticeable in a rendered frame of the animation. In some embodiments, the distortion is a deformity or change in the shape, form, and/or appearance of the feature represented by the adjusted set of points.

Accordingly, 3D animation system 300 may detect (at 504) the distortion based on the density or spacing between the set of points after the adjustments are applied. 3D animation system 300 may also detect (at 504) the distortion by comparing the shape created by the set of points in the last frame to the shape created by the adjusted set of points for the current frame, and by determining that the shape has changed by more than a threshold amount. In some embodiments, 3D animation system 300 compares the shape created by the adjusted set of points for the current frame against a feature model that tracks different shapes of a represented feature as it is animated.

3D animation system 300 enhances the current frame by supplementing (at 506) the adjusted set of points with dynamically generated points that correct the distortion and/or restore the shape of the represented feature after the set of points are adjusted. 3D animation system 300 may insert the dynamically generated points at positions in the 3D space of the point cloud that obscure a detected gap, hole, or visual inconsistency, and may define the visual characteristics of the dynamically generated points based on visual characteristics of neighboring points surrounding the gap, hole, or visual inconsistency. 3D animation system 300 may also insert the dynamically generated points at positions in the 3D space of the points according to a determined structural pattern or shape of the feature represented by the adjusted set of points.

For visual consistency across next frames of the animation, 3D animation system 300 may retain and adjust (at 508) the dynamically generated points in the next frames according to additional adjustments that are applied to the set of points. In other words, 3D animation system 300 does not remove the dynamically generated points from a next frame, and generate them anew at different positions that may create a visual inconsistency between the current frame and the next frame (e.g., points jumping from one position to another in an unnatural or jarring manner). Instead, 3D animation system 300 may link the dynamically generated points to the set of points when the dynamically generated points and the set of points represent the same feature. Subsequent adjustments that are defined for the set of points may be applied to the dynamically generated points to smoothly and seamlessly animate the represented feature.

3D animation system 300 may also inspect the adjusted set of points and the adjusted dynamically generated points of the next frame to detect any new distortions that may be caused by the adjustments and/or animation. 3D animation system 300 may correct (at 510) the distortions by supplementing the next frame with new points and/or may perform the dynamic noise reduction to remove outlying or deviating points that create visual inconsistency in the next frame.

Figure 6:
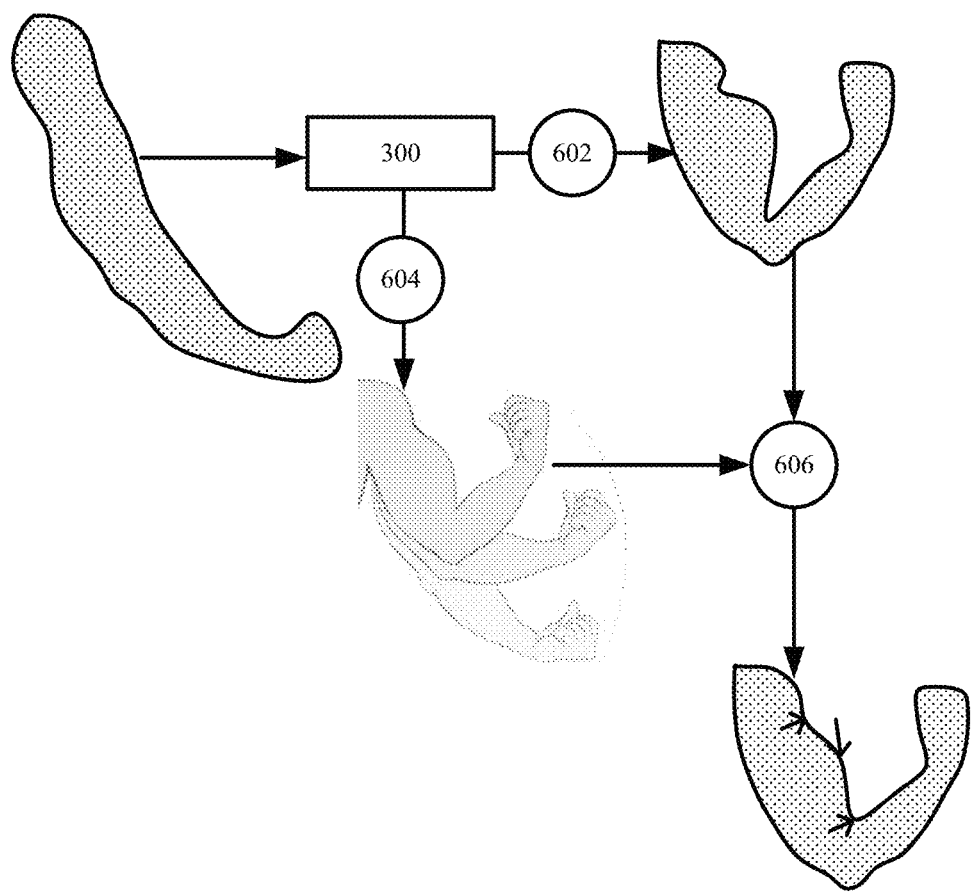
FIG. 6 illustrates an example of dynamically enhancing a point cloud animation by performing the motion-caused distortion correction to correct the shape of a feature in accordance with some embodiments.

FIG. 6 illustrates an example of dynamically enhancing a point cloud animation by performing the motion-caused distortion correction to correct the shape of a feature in accordance with some embodiments. 3D animation system 300 may apply (at 602) a transformation to a set of points representing a human arm. The transformation adjusts the set of points to bend the arm at the elbow and contract the muscles in the upper arm. The adjustments result in the represented arm having a distorted shape.

3D animation system 300 obtains (at 604) an animation model for the represented arm. The animation model may track different possible shape changes and color changes that occur during different arm animations.

3D animation system 300 compares (at 606) the animation model to the set of points resulting from the transformation, and detects various distortions in the shape of the represented arm. 3D animation system 300 dynamically adjusts (at 608) the transformed set of points to better match the motion and/or shape of the animation model.

Figure 7:
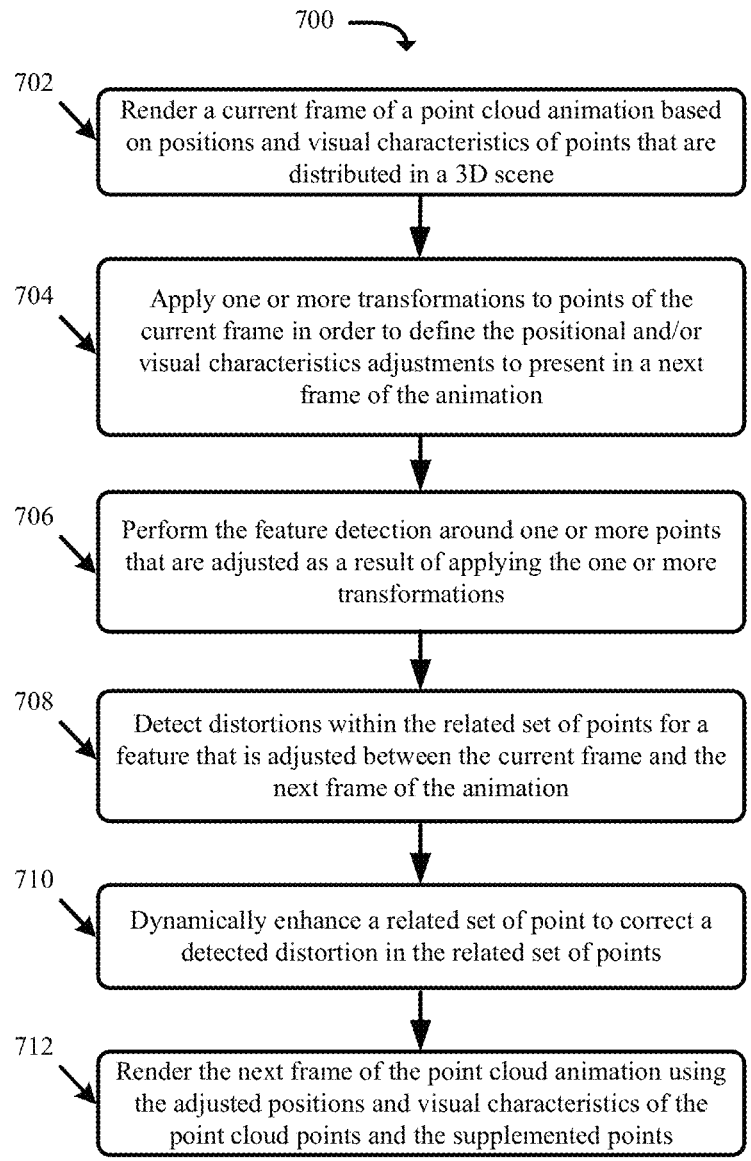
FIG. 7 presents a process for dynamically supplementing transformed points of a point cloud to correct for motion-caused distortions in a point cloud animation in accordance with some embodiments presented herein.

FIG. 7 presents a process 700 for dynamically supplementing transformed points of a point cloud to correct for motion-caused distortions in a point cloud animation in accordance with some embodiments presented herein. Process 700 is implemented by 3D animation system 300.

Process 700 includes rendering (at 702) a current frame of a point cloud animation based on positions and visual characteristics of points that are distributed in a 3D scene. The current frame may be a first frame of the animation or any frame between the first frame and the last frame of the animation. The points producing the visualization of the current frame may be defined in a point cloud that is associated with the current frame, or may be defined as a result of adjusting points from a prior frame of the animation according to one or more applied transformations.

Process 700 includes applying (at 704) one or more transformations to points of the current frame in order to define the positional and/or visual characteristics adjustments to present in a next frame of the animation. Applying (at 704) the one or more transformations may include adjusting positional and non-positional values of different points according to formulas, expressions, or other values defined in the one or more transformation and/or for the next frame of the animation.

Process 700 includes performing (at 706) the feature detection around one or more points that are adjusted as a result of applying (at 704) the one or more transformations. A point is adjusted when the one or more transformations change any positional element or non-positional element of the point from the current frame to the next frame. 3D animation system 300 may exclude other points, that represent features of the 3D scene that are not adjusted from the current frame to the next frame, from the feature detection as those points and represented features remain unchanged and do not be dynamically enhanced or further adjusted in the next frame.

Performing (at 706) the feature detection includes searching around each adjusted point to find other related points that collectively form or represent a common surface, part, or feature within the 3D scene represented by the point cloud. Specifically, the feature detection includes detecting related sets of points for features that have received some positional or visual characteristic adjustment from the current frame to the next frame.

Process 700 includes detecting (at 708) distortions within the related set of points for a feature that is adjusted between the current frame and the next frame of the animation. Detecting (at 708) the distortions may include analyzing the positional and non-positional values of the related set of points to detect gaps, holes, visual inconsistencies, and/or deformities in the shape, form, and/or appearance of the feature as a result of the adjustments made to one or more of the related set of points.

To detect gaps, holes, or visual inconsistencies, 3D animation system 300 may compare the spacing between a related set of points in the current frame and after adjustment for the next frame. A gap, hole, or visual inconsistency may be detected when the spacing in between points increases in certain regions relative to the current frame and when the spacing exceeds a threshold. In this manner, 3D animation system 300 may retain intentional gaps, holes, or visual inconsistencies that existed in the current and/or previous frames, and may detect and correct new gaps, holes, or visual inconsistencies that arise because of the transformations that were applied to define the next frame of the animation.

To detect deformities in the shape, form, and/or appearance of an adjusted feature, 3D animation system 300 compares the structural arrangement and/or pattern of the related set of points representing an adjusted feature in the current frame to the structural arrangement and/or pattern of the related set of points after being adjusted for the next frame. Based on the comparison, 3D animation system 300 determines if the structural arrangement and/or pattern has changed by more than a threshold amount. If the structural arrangement and/or pattern changes by more than the threshold amount, 3D animation system 300 may determine that the represented feature has been improperly distorted by the applied transformations and that the applied transformation produced a visual inconsistency in the next frame of the animation.

Similarly, 3D animation system 300 may compare the visual characteristic commonality shared by the related set of points in the current frame to the visual characteristic commonality shared by the related set of points after being adjusted for the next frame to determine if the visual characteristic commonality has changed by more than a threshold amount. A distortion may be detected when the visual characteristics of the related set of points changes abruptly (e.g., by more than the threshold amount) in certain regions, thereby creating a visual inconsistency between the current frame and the next frame of the animation.

Process 700 includes dynamically enhancing (at 710) a related set of points with a detected (at 708) distortion. In some embodiments, dynamically enhancing (at 710) the related set of points includes supplementing the related set of points with artificially generated points that correct or remove the detected (at 708) distortion. In some such embodiments, 3D animation system 300 defines new points at the region of space of the detected (at 708) distortion. For instance, the detected (at 708) distortion may correspond to a region of 3D space with a motion-caused gap or hole where the spacing between the related set of points exceeds a threshold. 3D animation system 300 may generate new points in that region of 3D space to fill the gap or hole, and may define the visual characteristics of the new points based on the visual characteristics of adjacent or neighboring points from the related set of points. In some other embodiments, 3D animation system 300 defines new points to restore or more gradually shift away from the structural arrangement or pattern of the related set of points in the current frame, or to restore or more gradually shift away from the visual characteristic commonality of the related set of points in the current frame.

Process 700 includes rendering (at 712) the next frame of the point cloud animation using the positions and visual characteristics of the point cloud points resulting from any applied transformations and/or distortion corrections, and the supplemented points that are added to dynamically enhance the next frame, wherein the supplemented points further correct for any distortion that may have been caused by the motion and/or adjustments applied to the points of the current frame in order to generate the points of the next frame. Rendering (at 712) the next frame include generating a next visualization that smoothly and seamlessly changes parts of a last visualization generated from rendering the current frame.

The newly added points become part of the point cloud animation and are included when applying transformations to generate subsequent frames of the animation (e.g., frames after the next frame). For instance, 3D animation system 300 may perform the feature detection based on the dynamically enhanced points of the next frame, may select a related set of points that forms a particular feature with original points, adjusted points, and/or artificially generated points, and may apply a transformation to the selection of the related set of points in order to animate the particular feature for a subsequent frame of the animation. The artificially generated points are also retained and included in the noise reduction and distortion detection analysis. Accordingly, the dynamic enhancements are carried throughout the animation, thereby ensuring consistent and smooth transitions between frames of the animation without visual inconsistencies of noise that is removed from one frame and reappearing in a next frame or an artificially generated point in one frame disappearing from a next frame.

Figure 8:
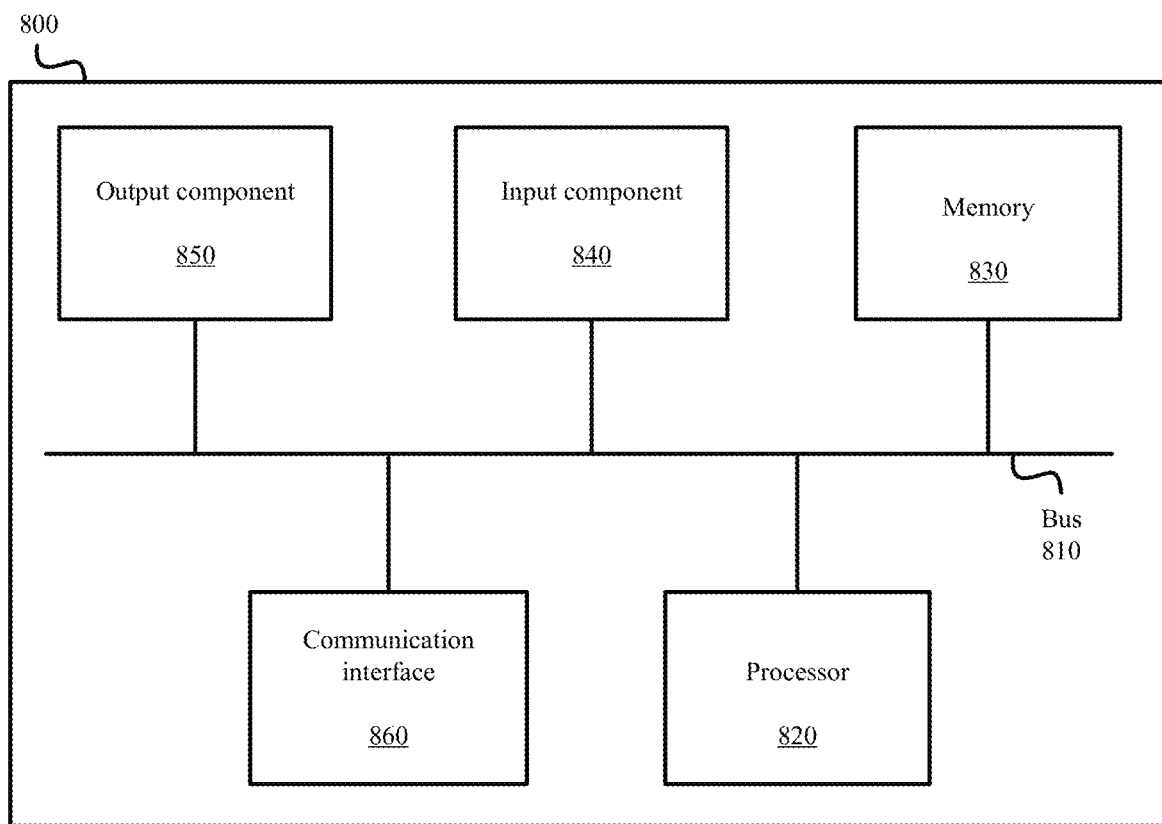
FIG. 8 illustrates example components of one or more devices, according to one or more embodiments described herein.

FIG. 8 is a diagram of example components of device 800. Device 800 may be used to implement one or more of the tools, devices, or systems described above (e.g., 3D animation system 300). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a plurality of points that are distributed across a three-dimensional ("3D") space and that collectively form a current frame of a 3D animation;
   detecting a particular set of points from the plurality of points that share one or more of a common structure or a non-positional commonality of a feature in the 3D animation;
   defining an animation of the feature between the current frame and a next frame of the 3D animation that is after the current frame based on one or more adjustments that are applied to the particular set of points;
   detecting a point from the particular set of points that deviates from the one or more of the common structure or the non-positional commonality of the feature after the one or more adjustments are applied to the particular set of points based on a comparison between positional and non-positional values of the particular set of points before and after the one or more adjustments are applied; and
   dynamically enhancing the 3D animation by correcting a distortion that is caused by the one or more adjustments unintentionally adjusting the point to deviate from the one or more of the common structure or the non-positional commonality of other points from the particular set of points point prior to rendering the next frame of the 3D animation.

2. The method of claim 1, wherein defining the animation comprises:
   receiving a second plurality of points for the next frame of the 3D animation, wherein the second plurality of points defines a different positioning or visual characteristics for one or more points of the particular set of points than the plurality of points that form the current frame of the 3D animation.

3. The method of claim 1, wherein defining the animation comprises:
   receiving a transformation; and
   applying the one or more adjustments to the particular set of points according to the transformation.

4. The method of claim 1, wherein correcting the distortion comprises:
   removing the point from the rendering of the next frame and from the plurality of points used in defining a subsequent frame of the 3D animation that is after the next frame.

5. The method of claim 1, wherein correcting the distortion comprises:
   restoring the one or more of the common structure or the non-positional commonality between the point and other points of the particular set of points by adjusting one or more of a position or visual characteristics of the point to match the common structure or the non-positional commonality shared by the other points after applying the one or more adjustments to the particular set of points.

6. The method of claim 1, wherein detecting that the point deviates from the one or more of the common structure or the non-positional commonality of the feature comprises:
   determining that the one or more adjustments cause the point to deviate from a particular structural pattern of the feature after the one or more adjustments are applied to the particular set of points.

7. The method of claim 1, wherein correcting the distortion comprises:
   repositioning the point in the 3D space to conform with the common structure of the feature represented by other points of the particular set of points after the one or more adjustments are applied to the particular set of points.

8. The method of claim 1, wherein detecting that the point deviates from the one or more of the common structure or the non-positional commonality of the feature comprises:
   determining that the one or more adjustments cause the point to deviate from color values of the feature after the one or more adjustments are applied to the particular set of points.

9. The method of claim 1, wherein correcting the distortion comprises:
   adjusting color values of the point to conform with color values of other points from the particular set of points after the color values of the point are made to deviate from the color values of the other points by the one or more adjustments.

10. The method of claim 1, wherein detecting that the point deviates from the one or more of the common structure or the non-positional commonality of the feature comprises:
    determining that the one or more adjustments change a position or visual characteristics of the point by more than a threshold amount than other points of the particular set of points.

11. The method of claim 1, wherein correcting the distortion comprises:
    generating a new point in between the point and one or more other points of the particular set of points in response to a distance between the point and the one or more other points exceeding a threshold.

12. The method of claim 1,
    wherein detecting that the point deviates from the one or more of the common structure or the non-positional commonality of the feature comprises:
        detecting a gap in the feature in between an adjusted position of the point and an adjusted position of one or more points from the particular set of points; and
    wherein correcting the distortion comprises:
        defining a new point that obscures the gap.

13. The method of claim 1, wherein detecting that the point deviates from the one or more of the common structure or the non-positional commonality of the feature comprises:
    obtaining an animation model of the feature; and
    determining that the one or more adjustments that are applied to the particular set of points cause the point to have a position or visual characteristics that deviates from positions and visual characteristics modeled in the animation model of the feature.

14. The method of claim 13, wherein correcting the distortion comprises:
adjusting one or more of the position or the visual characteristics of the point according to the positions and visual characteristics modeled in the animation model of the feature.

15. The method of claim 1 further comprising:
rendering the current frame of the animation based on positions and visual characteristics defined for the plurality of points; and
rendering the next frame of the animation based on adjusted positions and visual characteristics defined for the plurality of points after applying the one or more adjustments to the particular set of points and after correcting the distortion in the particular set of points.

16. A three-dimensional ("3D") animation system comprising:
one or more hardware processors configured to:
receive a plurality of points that are distributed across a three-dimensional ("3D") space and that collectively form a current frame of a 3D animation;
detect a particular set of points from the plurality of points that share one or more of a common structure or a non-positional commonality of a feature in the 3D animation;
define an animation of the feature between the current frame and a next frame of the 3D animation that is after the current frame based on one or more adjustments that are applied to the particular set of points;
detect a point from the particular set of points that deviates from the one or more of the common structure or the non-positional commonality of the feature after the one or more adjustments are applied to the particular set of points based on a comparison between positional and non-positional values of the particular set of points before and after the one or more adjustments are applied; and
dynamically enhance the 3D animation by correcting a distortion that is caused by the one or more adjustments unintentionally adjusting the point to deviate from the one or more of the common structure or the non-positional commonality of other points from the particular set of points point prior to rendering the next frame of the 3D animation.

17. The 3D animation system of claim 16, wherein defining the animation comprises:
receiving a transformation; and
applying the one or more adjustments to the particular set of points according to the transformation.

18. The 3D animation system of claim 16, wherein correcting the distortion comprises:
removing the point from the rendering of the next frame and from the plurality of points used in defining a subsequent frame of the 3D animation that is after the next frame.

19. The 3D animation system of claim 16, wherein correcting the distortion comprises:
restoring the one or more of the common structure or the non-positional commonality between the point and other points of the particular set of points by adjusting one or more of a position or visual characteristics of the point to match the common structure or the non-positional commonality shared by the other points after applying the one or more adjustments to the particular set of points.

20. A non-transitory computer-readable medium storing instructions that, when executed by one or more processors of a three-dimensional ("3D") animation system, cause the 3D animation system to perform operations comprising:
receiving a plurality of points that are distributed across a three-dimensional ("3D") space and that collectively form a current frame of a 3D animation;
detecting a particular set of points from the plurality of points that share one or more of a common structure or a non-positional commonality of a feature in the 3D animation;
defining an animation of the feature between the current frame and a next frame of the 3D animation that is after the current frame based on one or more adjustments that are applied to the particular set of points;
detecting a point from the particular set of points that deviates from the one or more of the common structure or the non-positional commonality of the feature after the one or more adjustments are applied to the particular set of points based on a comparison between positional and non-positional values of the particular set of points before and after the one or more adjustments are applied; and
dynamically enhancing the 3D animation by correcting a distortion that is caused by the one or more adjustments unintentionally adjusting the point to deviate from the one or more of the common structure or the non-positional commonality of other points from the particular set of points point prior to rendering the next frame of the 3D animation.

\* \* \* \* \*